United States Patent [19]

Carmichael et al.

[11] Patent Number: 4,976,186
[45] Date of Patent: Dec. 11, 1990

[54] CONTROL SYSTEM FOR MECHANICALLY ADJUSTABLE SPEED MOTOR DRIVES

[75] Inventors: Keith L. Carmichael, Columbus, Ind.; James F. Runyan, Cincinnati, Ohio

[73] Assignee: Reliance Electric Company, Greenville, S.C.

[21] Appl. No.: 287,097

[22] Filed: Dec. 20, 1988

[51] Int. Cl.⁵ .............................................. F01B 1/00
[52] U.S. Cl. ...................................... 91/166; 91/416; 91/417 R
[58] Field of Search ................. 91/165, 166, 416, 417, 91/235, 321, 446; 417/279

[56] References Cited

U.S. PATENT DOCUMENTS

| | | | |
|---|---|---|---|
| 862,867 | 8/1907 | Eggleston | 417/390 |
| 3,048,151 | 8/1962 | Kudlaty | 91/417 |
| 3,472,125 | 10/1969 | Noble | 91/417 |
| 3,683,748 | 8/1972 | Mahl et al. | 91/416 |
| 3,957,395 | 5/1976 | Ensign | 417/279 |
| 4,046,060 | 9/1977 | Becker et al. | 91/166 |
| 4,161,135 | 7/1979 | Garlinghouse | 91/417 |
| 4,253,692 | 3/1981 | Garlinghouse | 91/415 |
| 4,817,661 | 4/1989 | Howeth | 91/417 |

FOREIGN PATENT DOCUMENTS

| | | | |
|---|---|---|---|
| 0054619 | 6/1982 | European Pat. Off. | 91/417 |
| 0663896 | 5/1979 | U.S.S.R. | 91/417 |
| 0739260 | 6/1980 | U.S.S.R. | 91/417 |
| 0916787 | 3/1982 | U.S.S.R. | 91/417 |

OTHER PUBLICATIONS

IBM Technical Bulletin, vol. 19, No. 9, Feb. 1977.

Primary Examiner—Carl D. Price
Assistant Examiner—Thomas Denion
Attorney, Agent, or Firm—Dority & Manning

[57] ABSTRACT

A control system for mechanically adjustable motor drives which have a shiftable speed control for controlling the speed of the drive. The system includes a double acting pneumatic cylinder which is remotely controlled to shift the speed control by varying the air pressure in the double acting cylinder, to increase or to decrease the speed of the motor drive. The air pressure can be varied manually or by automatic control means.

10 Claims, 1 Drawing Sheet

CONTROL SYSTEM FOR MECHANICALLY ADJUSTABLE SPEED MOTOR DRIVES

BACKGROUND OF THE INVENTION

This invention relates to a control system for a position type control. The control system controls the position type control pneumatically.

In such systems, the positioner is the main controlling device. In the past, these systems have had a bellows unit which employs the principle of balanced operation by spring loading the bellows unit to the same force as that exerted by the control instrument air pressure. The bellows unit is connected to a pilot valve. When the control instrument air pressure is increased, the bellows move against the balance spring. This opens the pilot valve in the direction to allow the air supply to flow into the back of the cylinder, pushing the piston forward, which thereby increases the output speed of the motor drive. As the piston moves forward, a cam which is mounted on the piston rod moves the positioning lever outwardly. This compresses the balance spring through the slider assembly and the bellows lever assembly. The piston moves forward until the balance spring is compressed to give sufficient spring load to balance the increased control instrument air pressure. When this balance is obtained, the bellows will move back to the neutral position and close the pilot valve. This stops the air supply flow to the back of the cylinder and the piston ceases to move.

When the control instrument air pressure is decreased, this operation is reversed. The control instrument air pressure is lower than the balance spring pressure. This allows the balance spring to move the bellows in the opposite direction, which opens the pilot valve to allow air to escape from the back of the cylinder. The back air pressure in the cylinder and the balance spring force will cause the piston to move backward, which will decrease the output speed of the motor drive. As the cam moves with the piston rod, it allows the positioning lever to move in, decompressing the balance spring. The piston will move until the balance spring pressure balances the control instrument air pressure. The bellows will assume the neutral position closing the pilot valve and stopping the piston.

The above-described known control system is a good control, but is not as positive in slowing the drive as is desired. Furthermore, since it depends upon the spring force to move the positioner assembly back and to thereby decrease the speed of the motor drive, it is necessary to change the spring when a greater force is desired or necessary.

SUMMARY OF THE INVENTION

It is an object of the present invention to provide a control system for shifting the adjustable speed control positively in either the increase or decrease speed directions.

This object is achieved by providing a system wherein the shiftable speed control is shifted in either direction by means of a double acting pneumatic cylinder which is connected to the speed control lever. On one side of the cylinder, an air supply is provided at a predetermined pressure, which is lower than the pressure of the air received from a supply line. The other side of the double acting cylinder is connected to the air supply line at a pressure level which exceeds that provided to the back side of the piston, so that the piston will move in the increase speed direction when a valve in the line connecting the cylinder with the air supply is opened to pressurize the front side of the piston in the cylinder. This valve is operated remotely and enables the operator to pressurize the front side of the cylinder whenever an increase in speed is desired from the motor control. This movement tends to compress the air in the back side of the piston in the cylinder which acts as a resilient force to offset the pressure applied to the front side of the piston, thereby permitting the piston to move smoothly in the increased speed direction until an equilibrium between the back pressure and the front pressure is attained.

When it is desired to slow or to decrease the speed of the motor drive, a solenoid valve is operated to close off the air supply to the front side of the piston in the cylinder, and a second solenoid valve is operated to bleed the air in the front side, thereby slowly reducing the pressure on the front side of the cylinder to a point at which the air pressure on the back side exceeds that on the front side. When this happens, the piston in the double acting cylinder moves the shiftable speed control means in the back direction and thereby slows down the adjustable speed motor drive until an equilibrium is attained or until the piston moves to the front end of said cylinder.

The control system of the invention enables the controls to be located at a point remote from the operator. In one application, where the device must operate in an explosion-proof location, the remote operator station can be located outside of the explosion-proof room and the operator can control the operation of the control system through his or her manipulation of the control valves to vary the speed of the motor drive as desired.

BRIEF DESCRIPTION OF THE DRAWINGS

The invention will now be described with reference to the attached drawings, in which.

DETAILED DESCRIPTION OF THE DRAWINGS

Figure 1:
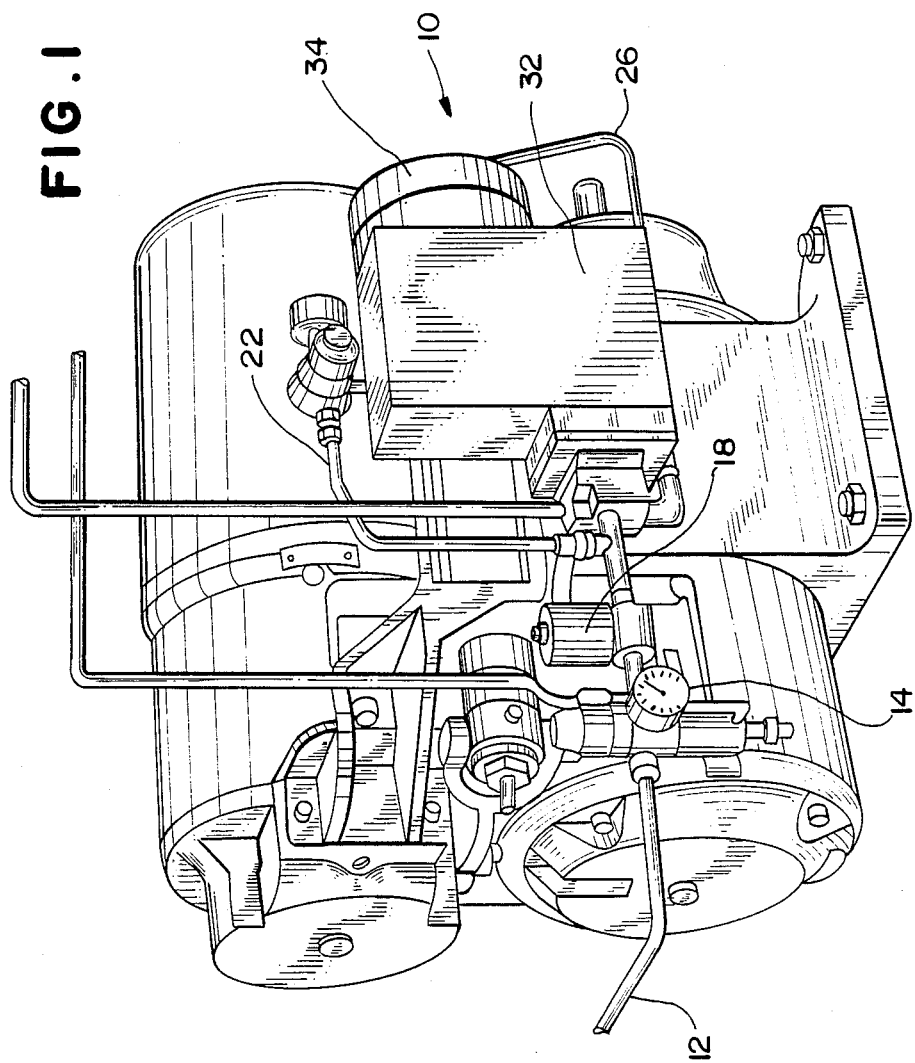
FIG. 1 is a perspective view of an adjustable speed motor drive with the control system of the invention.

Referring now to FIG. 1 of the drawings wherein a drive control 10 system is illustrated. Air is supplied to the drive control system through an air supply line 12 at a pressure of between 80 and 120 pounds per square inch.

Supply line 12 contains a filter, regulator, and gauge 14 for filtering the air supply and for regulating and gauging the air pressure supplied. The pressure of the air is reduced to 40 psi by regulator 14, which is designed to test the pressure in the line. If the pressure is below normal, switch 16 opens and solenoid valve 18 closes, trapping the air in the system so that no change in drive speed occurs at this time. At the same time switch 16 cuts the power to the remote operator station so that the control will make no attempt to shift to speed. If the pressure is sufficient, pressure switch 16 remains closed and the control solenoid valve remains open so the air can continue to flow through the system.

Figure 2:
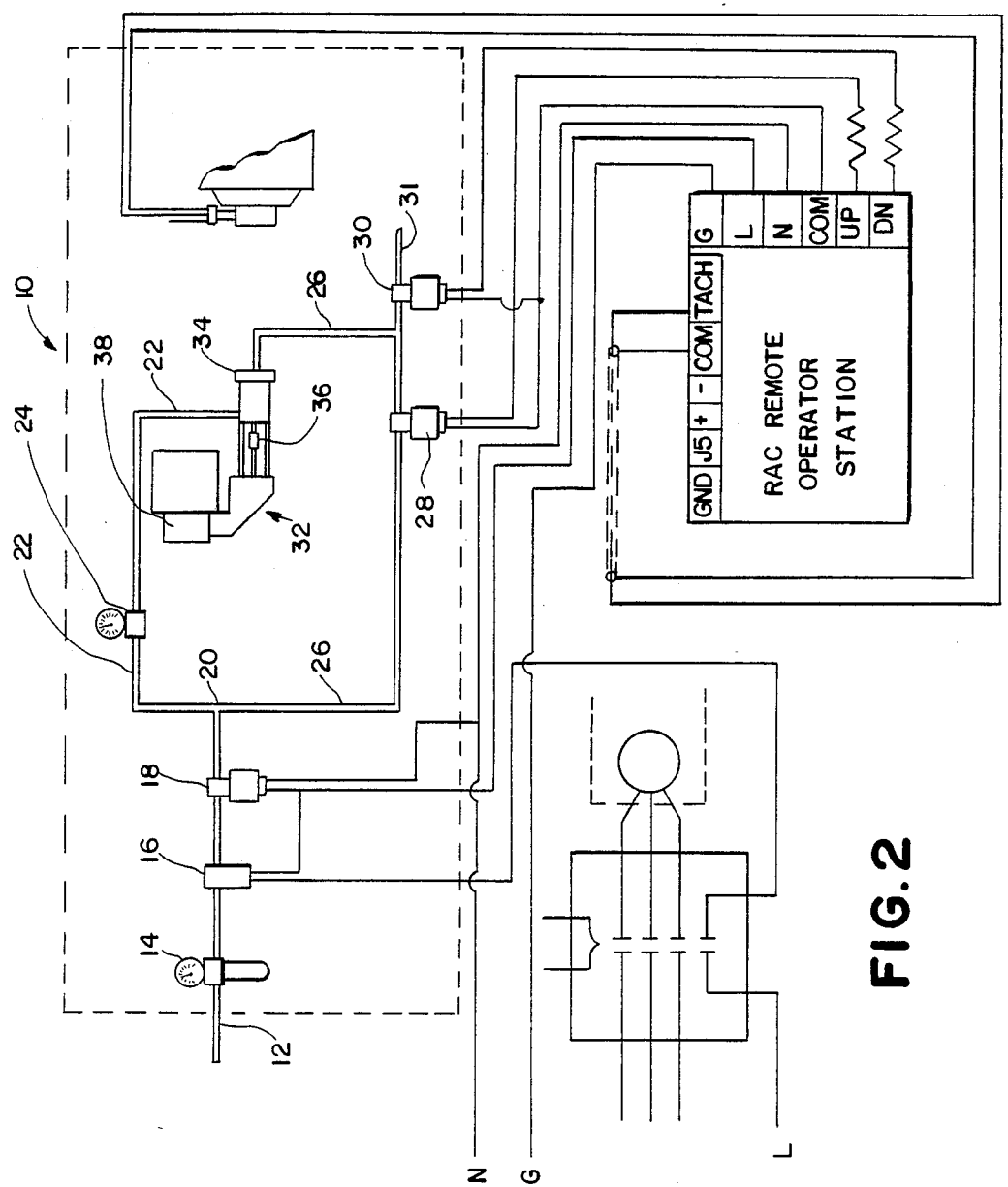
FIG. 2 is a schematic view of the control system of the invention used to control the adjustable speed motor drive shown in FIG. 1.

Referring now specifically to FIG. 2 wherein supply line 12 filter, regulator, and gauge 14, pressure switch 16, and solenoid valve 18 are illustrated schematically. After line 12 passes solenoid valve 18, it intersects with a transverse line 26 at a T-junction 20. T-junction 20 connects line 12 to a backpressure line 22 and a front pressure line 26. Back pressure line 22 conveys the pressurized air to a back pressure regulator 24 where its pressure is reduced from the 40 psi supplied by filter, regulator 14 to a pressure of 10 psi, which is then supplied to the back side of the piston in cylinder 34.

On the other hand, the air pressure supplied to front pressure line 26 is directed to the front side of cylinder 34. Located between cylinder 34 and T-junction 20 is an upshift solenoid operated valve 28, which may be remotely controlled by the remote operator. Interposed between upshift solenoid valve 28 and the front end of the cylinder 34 is a bleed line 31 which contains a solenoid operating downshift valve 30.

A positioner assembly 32 comprises pneumatic cylinder 34 which is a double acting pneumatic cylinder and includes a piston rod 36 which is connected to motor drive 38 and is adapted to move motor drive 38 in either an increase or decrease speed direction or to maintain the motor drive 38 in an equilibrium position where no change in speed is desired.

In operation, plant air is supplied at between 80 and 120 psi to the filter, regulator, and gauge 14 which then reduces the pressure to between 40 and 60 psi depending on the size of the motor drive. The air flows into pressure switch 16, which is designed to test the pressure in line 12 downstream of filter, regulator, and gauge 14. If the pressure is below normal, switch 16 will open and the control solenoid 18 will close, trapping the air in line 12 between filter regulator and gauge 14 and solenoid valve 18 so that no change in the drive speed occurs at this time. At the same time, switch 16 interrupts the power supply to the remote operator station so that the control will make no attempt to shift the speed of the motor drive. If the pressure is sufficient, switch 16 remains closed and normal operation may proceed. The control solenoid valve 18 remains open so that the air can continue through the system. After the air passes solenoid valve 18, the line divides at T-junction 20 into a back pressure supply line 22 and a front pressure supply line 26.

The air entering into back pressure line 22 passes through a pressure regulator 24 where its pressure is regulated or reduced to between 10 and 30 psi depending on the size of the drive. The reduced pressure is then supplied to the back side of cylinder 34 to provide for a pressure differential in each half of cylinder 34, to change or to maintain the speed of the motor drive.

Line 26 is connected to the front side of cylinder 34. Interposed between the front side of cylinder 34 and T-junction 20 is an upshift solenoid operated valve 28. When upshift solenoid operated valve 28 is energized, the upshift solenoid valve opens and air at the pressure provided by filter, regulator, and gauge 14 is applied to the front side of the cylinder causing the drive to increase speed. When the drive attains the desired speed, solenoid valve 28 closes trapping the air in the front side of the cylinder. This air achieves equilibrium with the air on the back side of the cylinder with the pressure and volume products being equal. Also connected to the front side of the cylinder, either directly or to the front pressure line 26 at a point between the upshift solenoid valve 28 and the front end of cylinder 34 is a bleeder line 31 which comprises a downshift solenoid valve 30. Solenoid valve 30 is closed during a speed upshift and during the equilibrium drive of the motor drive.

When it is desired to reduce the speed of the motor drive solenoid valve 28 is closed and downshift solenoid valve 30 is opened to bleed the air under pressure out of the front end of cylinder 34, thereby permitting piston rod 36 and the positioner assembly 32 of motor drive 38 to move in a downspeed direction. Whenever a lower speed is attained, downshift solenoid valve 30 may be closed while maintaining upshift solenoid valve 28 closed so as to permit an equilibrium at a lower speed. As shown, all of the solenoid operated valves can be operated by the operator at a remote operating station.

As described hereinabove, the control of the pneumatic control system is operated manually by the operator. However, it is to be understood that this system may also be operated by an automatic control system such as that furnished by the Dodge-Master Reeves Division of Reliance Electric of Greenville, S.C. and furnished under the tradmark REEVES AUTOMATIC CONTROL.

It will be understood that the above is only exemplary of the system of the invention and that various changes may be made therein without departure from the spirit and scope of the claims appended hereto.

What is claimed is:

1. A control system for a mechanically adjustable speed motor drive, having a shiftable speed control for controlling the speed of said motor drive, comprising:
   (a) a pneumatic double acting cylinder having a piston rod connected to said shiftable speed control for shifting the position of said control to vary the speed of said motor drive;
   (b) an air supply line for supplying air at a first predetermined pressure;
   (c) a pressure regulator for receiving said supplied air and for changing the pressure of the supplied air to a first predetermined pressure;
   (d) a first line for receiving said air under said first predetermined pressure and for directing it to the back side of said double acting cylinder, having means between said pressure regulator and said back side of said cylinder for reducing said first predetermined pressure to a lower second predetermined pressure before it reaches the back side of said cylinder;
   (e) a second line for receiving said air at said first predetermined pressure and for directing it to the front side of said cylinder at said first predetermined pressure, having a solenoid operated control valve in said second line between said pressure regulator and said cylinder for controlling the flow of air to said cylinder to increase the volume and pressure of air in the front side of said cylinder when it is desired to increase the speed of said motor drive; and
   (f) a solenoid operated bleeding valve and line for evacuating air from the front side of said cylinder when it is desired to reduce the speed of said motor drive.

2. A control system as set forth in claim 1, wherein said solenoid valves are controlled by an operator at a station remote from said adjustable speed motor drive and said adjustable speed motor drive is located in an explosion-proof environment.

3. A control system as set forth in claim 1, wherein said pressure regulator reduces the pressure of the air supplied by said supply line.

4. A control system as set forth in claim 1, wherein said solenoid operated control valve in said second line is closed when said double acting cylinder is in equilibrium.

5. A control system as set forth in claim 1, wherein said solenoid operated control valve in said second line is closed when said bleeding valve is open for evacuating air from the front side of said cylinder.

6. A control system as set forth in claim 1, wherein said control system is controlled by automatic speed control means for maintaining the speed of said motor drive.

7. A control system as set forth in claim 6, wherein said pressure regulator reduces the pressure of the air supplied by said supply line.

8. A control system as set forth in claim 6, wherein said solenoid operated control valve in said second line is closed when said double acting cylinder is in equilibrium.

9. A control system as set forth in claim 6, wherein said solenoid operated control valve in said second line is closed when said bleeding valve is open for evacuating air from the front side of said cylinder.

10. A control system for a mechanically adjustable speed motor drive having a shiftable speed control for controlling the speed of said motor drive comprising:

(a) a pneumatic double acting cylinder having a piston rod connected to said shiftable speed control for controlling the position of said shiftable control and therefore speed of the motor drive;

(b) fluid conduit means connected to said cylinder for supply of fluid thereto, said conduit means comprising a first fluid line connected to a back side of said cylinder and a second fluid line connected to a front side of said cylinder;

(c) a source of fluid under pressure connected to said fluid conduit means;

(d) fluid pressure testing means located along said fluid conduit means for determining fluid pressure in said conduit means upstream of said testing means, and permitting fluid flow thereby upon sensing fluid pressure below a predetermined threshold level;

(e) valve means located along said conduit means between said fluid testing means and said cylinder, said valve means being controlled by said testing means upon detection of fluid pressure below said threshold level to close said valve and preclude speed change for said motor drive;

(f) said second fluid conduit having a solenoid operated control valve located therealong between said fluid testing means and a front side of said cylinder for controlling fluid flow thereto; and (g) a solenoid operated control valve connected between said front side of said cylinder and the atmosphere for evacuating fluid form said front side of said cylinder when it is desirable to reduce the speed of said motor drive.

* * * * *